US010528541B2

(12) United States Patent
Radhakrishnan et al.

(10) Patent No.: US 10,528,541 B2
(45) Date of Patent: Jan. 7, 2020

(54) OFFLINE ACCESS OF DATA IN MOBILE DEVICES

(71) Applicant: SAP SE, Walldorf (DE)

(72) Inventors: Jagadish Radhakrishnan, Bangalore (IN); Dharmesh Rana, Bangalore (IN); Swati Krishna Setty, Bangalore (IN); Arjun Krishnakumar, Bangalore (IN)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 15/376,772

(22) Filed: Dec. 13, 2016

(65) Prior Publication Data
US 2018/0167258 A1 Jun. 14, 2018

(51) Int. Cl.
*G06F 16/22* (2019.01)
*H04L 12/24* (2006.01)
*G06F 16/93* (2019.01)
*G06F 16/28* (2019.01)

(52) U.S. Cl.
CPC ........ *G06F 16/2282* (2019.01); *G06F 16/284* (2019.01); *G06F 16/93* (2019.01); *H04L 41/024* (2013.01)

(58) Field of Classification Search
CPC ............. H04L 41/024; G06F 17/30339; G06F 17/30011; G06F 17/30595
See application file for complete search history.

(56) References Cited

U.S. PATENT DOCUMENTS

| | | | | |
|---|---|---|---|---|
| 8,613,070 | B1 * | 12/2013 | Borzycki | G06F 21/6218 726/8 |
| 9,575,981 | B2 * | 2/2017 | Dorman | G06F 16/168 |
| 2006/0277497 | A1 * | 12/2006 | Minagawa | G06F 3/14 715/819 |
| 2009/0024664 | A1 * | 1/2009 | Benbunan Garzon | G06F 16/9577 |
| 2011/0276569 | A1 * | 11/2011 | Kanefsky | G06F 16/9574 707/736 |
| 2012/0124069 | A1 * | 5/2012 | Zachar | G06Q 50/163 707/758 |
| 2012/0191231 | A1 * | 7/2012 | Wang | G11B 27/28 700/94 |

(Continued)

OTHER PUBLICATIONS

Kevin Kyle; "How To Half Hour: Introducing Mobile BI (MoBI)"; 2007 Business Objects S.A.; 18 pages http://www.sdn.sap.com/irj/boc/go/portal/prtroot/docs/library/uuid/905bf1fd-7664-2b10-90a8-e37cdbc39e96?QuickLink=index&overridelayout=true&32804960222350.

*Primary Examiner* — Uzma Alam
(74) *Attorney, Agent, or Firm* — Fish & Richardson P.C.

(57) ABSTRACT

In offline access of data in mobile devices, a request to access a document is received at a mobile server. The document is fetched from a BI platform to the mobile server. Plurality of requests is sent from the mobile server to the BI platform to retrieve data packages from the BI platform. The data packages is converted to a plurality relational database management tables at the mobile server. The plurality of relational database management tables is compressed to a compressed database. The compressed database is sent to the mobile device and stored. A new request is received at the mobile device for operations on the document. Based on the new request, operations are performed on the document based on the compressed database stored in the mobile device, when the mobile device is not connected to the mobile server.

17 Claims, 9 Drawing Sheets

(56) References Cited

U.S. PATENT DOCUMENTS

| | | | | |
|---|---|---|---|---|
| 2013/0159244 A1* | 6/2013 | Lavdas | ............... | G06F 16/116 707/602 |
| 2014/0032759 A1* | 1/2014 | Barton | ................ | H04L 67/10 709/225 |
| 2014/0189818 A1* | 7/2014 | Meyer | ................ | G06F 21/62 726/4 |
| 2014/0236908 A1* | 8/2014 | Sethuraman | ......... | G06F 16/215 707/693 |
| 2014/0245015 A1* | 8/2014 | Velamoor | ............ | H04L 63/061 713/171 |
| 2014/0258155 A1* | 9/2014 | Suryanarayanan | ..... | H04L 63/10 705/318 |
| 2014/0270409 A1* | 9/2014 | Hanna | ............. | G06Q 30/0609 382/118 |
| 2014/0344415 A1* | 11/2014 | Liu | ..................... | H04N 19/162 709/219 |
| 2014/0359165 A1* | 12/2014 | Chen | ..................... | H04W 4/50 709/247 |
| 2015/0135300 A1* | 5/2015 | Ford | ..................... | G06F 16/93 726/11 |
| 2015/0172891 A1* | 6/2015 | Persson | .............. | H04L 67/2823 370/236 |
| 2015/0332211 A1* | 11/2015 | Esfhani | .............. | G06Q 10/087 705/28 |
| 2016/0050296 A1* | 2/2016 | Crowther | ........... | H03M 7/3084 709/247 |
| 2017/0041643 A1* | 2/2017 | Yamagishi | ........... | H04N 21/235 |
| 2017/0371922 A1* | 12/2017 | Warrier | ................ | G06F 16/245 |
| 2018/0025042 A1* | 1/2018 | Fischer | ................ | G06F 17/241 707/625 |

\* cited by examiner

| row identifier | request | | response | |
|---|---|---|---|---|
| | openPlusMetadata 402 | | BLOB (Size: 1035438) 404 | datasetId |
| 1 | | | | |
| 2 | consumption 406 | | BLOB (Size: 6305) 408 | 2 |

"id_1","id_2","id_3","id_4","id_5","id_6","id_7","id_8","id_9","id_10","id_11","id_12","id_13","id_14","id_15","id_16","id_17","id_18","id_19","id_20"
"2014-01-11 00:00:00.0","Donald's Market","US","Arizona","Chandler","Donald's Market","2% Fat Content","Regular Milk",2
1","Glass","Refundable","Standard","30.24","7.68","48.0","3.0","24.0","22.56","2014/01/11 20:40:46","2014/01/14 00:00:00"
"2014-02-04 00:00:00.0","Donald's Market","US","Arizona","Chandler","Donald's Market","2% Fat Content","Regular Milk",1
1","Glass","Refundable","Standard","25.2","6.4","40.0","5.0","40.0","18.8","2014/02/04 20:28:52","2014/02/07 00:00:00"
"2014-02-27 00:00:00.0","Donald's Market","US","Arizona","Chandler","Donald's Market","2% Fat Content","Regular Milk",2
1","Glass","Refundable","Standard","10.4","2.72","16.0","1.0","8.0","7.68","2014/02/27 20:21:01","2014/03/02 00:00:00"

FIG. 4B

```
<hi:data_schema>
    <hi:columns>
412 → <hi:column id="id_1" name="Date" datatype="date" binding_key="0" />
414 → <hi:column id="id_2" name="Customer" datatype="string" length="27" binding_key="1" />
        <hi:column id="id_3" name="Store Country" datatype="string" length="2" binding_key="2" />
        <hi:column id="id_143" name="Order Date" datatype="string" length="19" binding_key="18" />
        <hi:column id="id_144" name="Delivery Date planned" datatype="string" length="19" binding_key="19" />
    </hi:columns>
    <hi:users_objects>
416 →   <hi:object id="id_19" name="Date" qualification="attribute" >
            <hi:object id="id_20" name="VALUE" qualification="property" column="id_1" />
        </hi:object>
```

FIG. 4C

OFFLINE ACCESS OF DATA IN MOBILE DEVICES

BACKGROUND

Enterprises use Business Intelligence (BI) tools or applications such as crystal reports, web intelligence, etc. BI applications enable various functionalities such as reporting, online analytical processing, data mining, predictive analysis, etc. BI applications and tools may be used to process and analyze enormous amount of data inter-related to each other. Such BI applications are required to be connected to the enterprise network to fetch data corresponding to the analytic operations performed on the BI application. This implies that for independent requests from the BI application, network resources are utilized to render corresponding response. The increase in network latency impacts the performance of the BI applications rendered on mobile devices. It is challenging to improve the performance of the BI applications rendered on mobile devices, while minimizing network latency.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 4A is an exemplary table illustrating workspace request and metadata, according to one embodiment.

FIG. 4B is an exemplary table illustrating data stream including raw data associated with a document, according to one embodiment.

FIG. 4C is an exemplary table illustrating global data mapping associated with raw data, according to one embodiment.

DETAILED DESCRIPTION

Embodiments of techniques for offline access of data in mobile devices are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
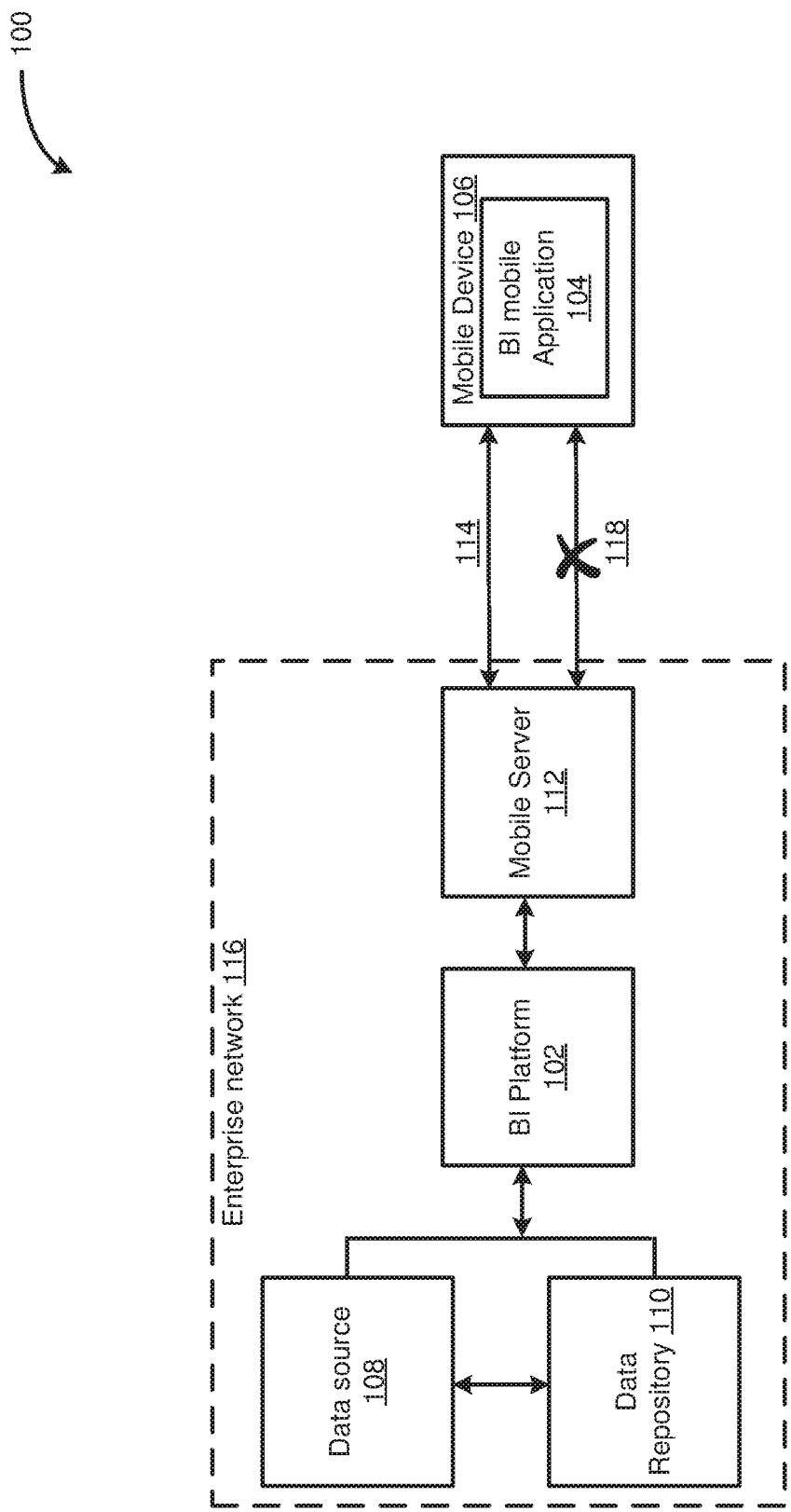
FIG. 1 is a block diagram illustrating high-level architecture in offline access of data in mobile devices, according to one embodiment.

FIG. 1 is block diagram 100 illustrating high-level architecture in offline access of data in mobile devices, according to one embodiment. Business Intelligence (BI) platform 102 enables various BI tools such as enterprise reporting, dashboards, data discovery, online analytical processing (OLAP) analysis, and predictive analysis. The various BI tools may be executed in BI mobile application 104 in web (not shown) or mobile device 106. The BI mobile application 104 includes a set of executable instructions for retrieving, analyzing and reporting or visualizing data as analytics information. Reports or documents may be generated at BI platform 102 based on data received from data source 108 and data repository 110. The data repository 110 may be a data warehouse having a repository of data collected from one or more data source systems. For example, data in the data warehouse may be collected from data source 108, and the data source 108 may be a database, external feed, data ware house, data mart, etc. A mobile server 112 is a mobile application enabling creation of applications that provides data to mobile device 106. Mobile server 112 is a lightweight application server that enables building and deployment of mobile applications. Mobile server 112 provides connectivity service connecting the BI platform 102 and the mobile device 106.

When the mobile device 106 is connected 114 to enterprise network 116, a request is received from a user in the BI mobile application 104 executing in the mobile device 106 to the mobile server 112. Based on the request, the mobile server 112 communicates with the BI platform 102 to fetch the documents from the data repository 110 and the data sources 108 and renders in the BI mobile application 104. The mobile server 112 initiates additional requests to the BI platform 102 to retrieve data required by the mobile device 106. The data is retrieved from the data repository 110 and the data sources 108, and is converted to a compressed database in the mobile server 112. The compressed database is received from the mobile server 112 and stored or persisted in the mobile device 106. Any subsequent request from the user in the BI mobile application 104 executing in the mobile device 106 is responded from the compressed database stored in the mobile device 106.

Consider a scenario where the mobile device 106 is not connected 118 to enterprise network 116, or the mobile device 106 is in offline mode and not connected 118 to the enterprise network 116. A request is received from the user in the BI mobile application 104 executing in the mobile device 106. The request is responded locally from the compressed database stored in the mobile device 106. Accessing the mobile server 112 and BI platform 102 in the enterprise network 116 is avoided, therefore improving performance of the BI mobile application 104 executing in the mobile device 106.

Figure 2:
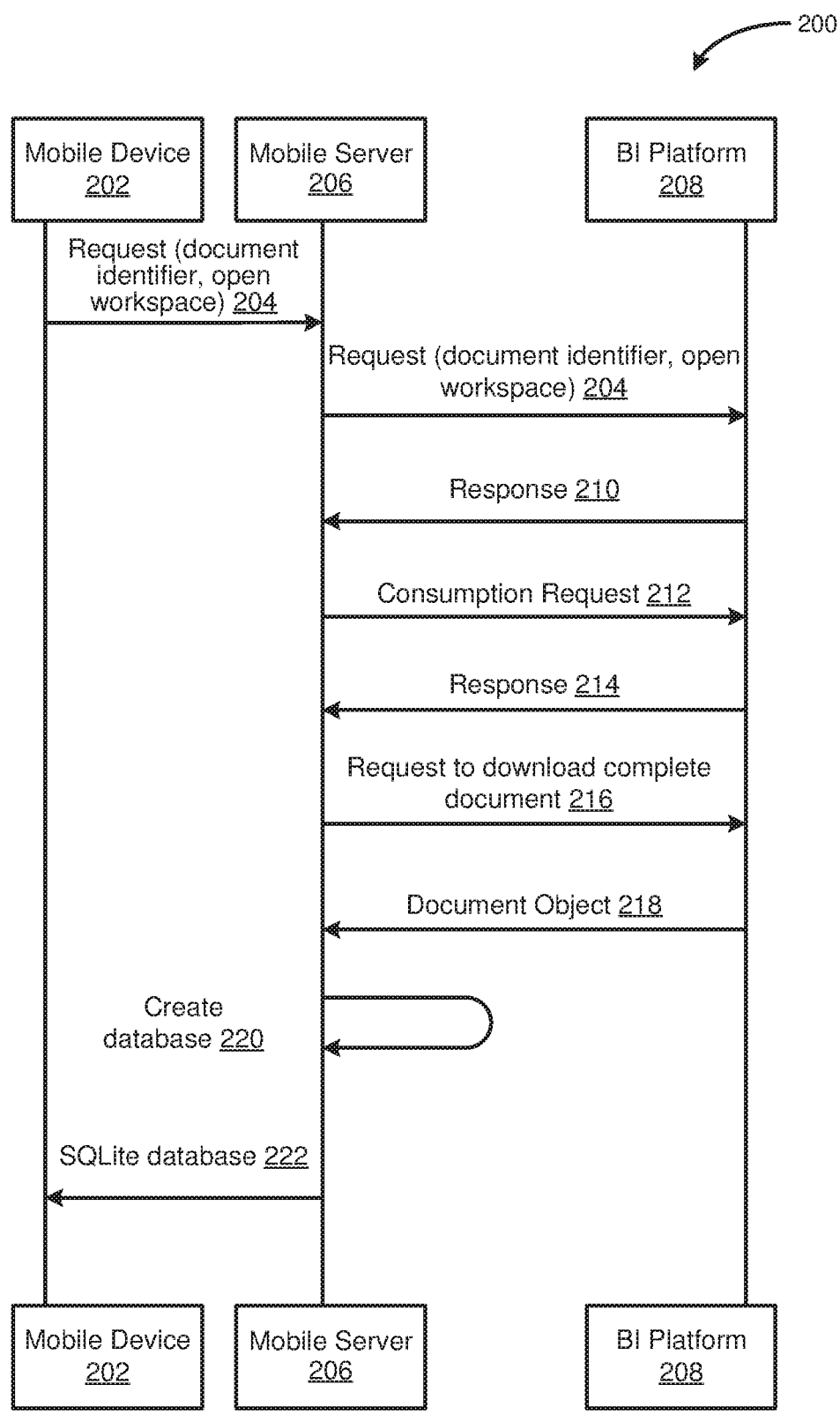
FIG. 2 is a sequence diagram illustrating a process for offline access of data in mobile devices, according to one embodiment.

FIG. 2 is sequence diagram 200 illustrating a process for offline access of data in mobile devices, according to one embodiment. A request 204 including parameters such as document identifier and open workspace is received front mobile device 202 at mobile server 206. The document identifier is the identifier of a document that the mobile device 202 requests to fetch from the mobile server 206. Request 204 may be an application programming interface (API) call to the mobile server 206. The mobile server 206 sends the request (document identifier, open workspace) 204 to BI platform 208. The BI platform 208 provides response 210 with workspace instance and metadata corresponding to the document. Metadata provides information about the document, for example, size, fields, location, ownership, etc., along with metadata for visualization such as graphical representation charts supported by the document, legend corresponding to the charts, etc. The document along with tables, graphical representation charts, etc., loaded into mobile server memory is referred to as a workspace or a workspace instance.

Additionally, the mobile server 206 sends consumption request 212 to retrieve global data mapping information required to interpret the contents of the document. Response 214 is provided with global data mapping information to the mobile server 206. Further, a request to download complete document 216 is sent to the BI platform 208. In response document object 218 is received at the mobile server 206. Document object 218 includes the complete document and raw data associated with the document. Raw data refers to the actual data values in the document; for example, the document may include customer raw data such as 'user A' for name, 'LA' for location, etc. Based on the request (document identifier, open workspace) 204 sent to the mobile server 206, consumption request 212 and request to download complete document 216 are sent proactively or automatically from the mobile server 206 to the BI platform 208. The proactive or automatic sending of multiple/plurality of requests such as consumption request 212 and request to download complete document 216 are without human user intervention. Response 210 with workspace instance and metadata corresponding to the document, response 214 with global data mapping information, and document object 218 including the complete document and raw data associated with the document are referred to as data packages.

In the mobile server 206, raw data from various data sources are available in a comma separated value (CSV) file format. The CSV file format is converted to a relational database management table such as Structured Query Language (SQL)ite® table. To interpret the contents of the CSV file format, the retrieved global data mapping information is converted to another SQLite® table. Response 210 including workspace instance and metadata corresponding to the document is converted to another SQLite table. Based on the create database 220 request, all the SQLite® tables generated in the mobile server 206 are compressed to a compression format such as GNU® zip (Gzip) to create a SQLite® database 222. The SQLite® database 222 is sent to the mobile device 202 as a compressed Gzip file, and stored in the mobile device 202. The document may be accessed from the compressed database stored in the mobile device 202 without communicating with the mobile server 206.

Figure 3:
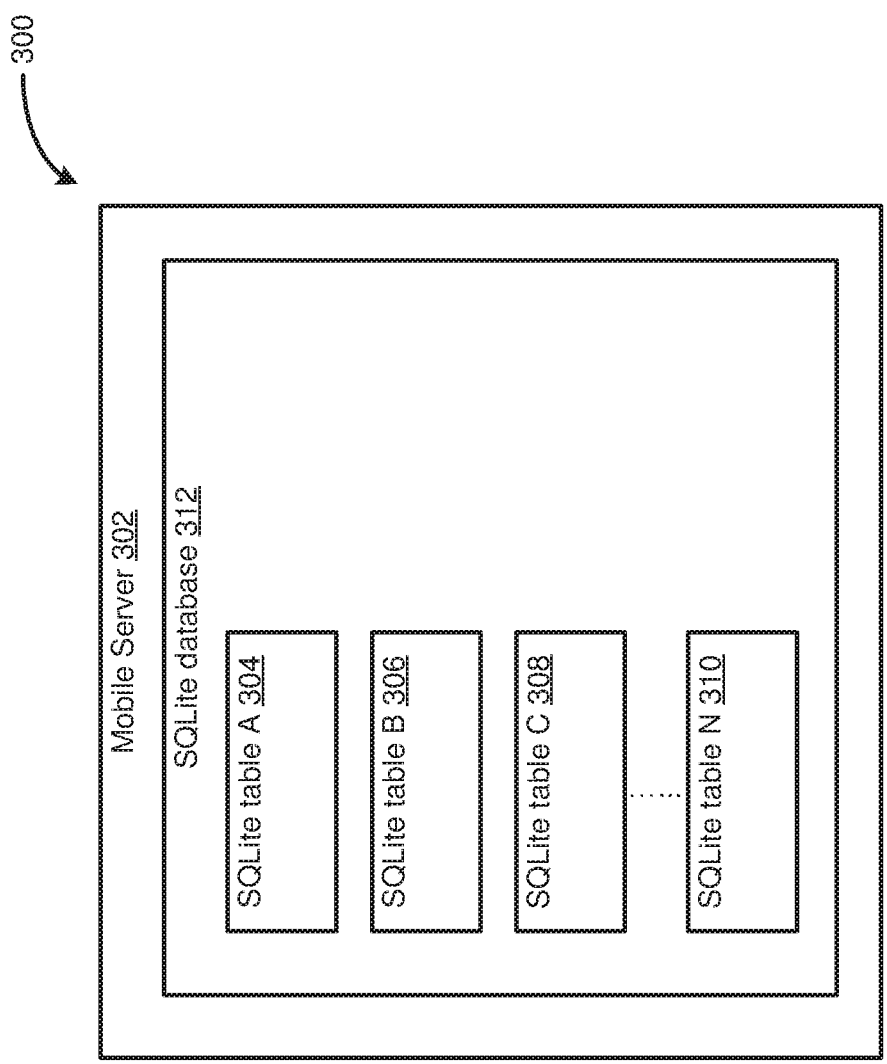
FIG. 3 is a block diagram illustrating an exemplary SQLite database generation at a mobile server, according to one embodiment.

FIG. 3 is block diagram 300 illustrating an exemplary SQLite® database generation at a mobile server, according to one embodiment. Raw data retrieved from various data sources to mobile server 302 are available in a comma separated value (CSV) file format. In the mobile server 302, the CSV file format is converted to a relational database management table such as SQLite table. For individual data sources corresponding SQLite® tables are created, for example, for data source A corresponding SQLite® table A 304 is generated, for data source B corresponding SQLite® table B 306 is generated, etc. Metadata associated with the raw data may be converted to a SQLite® table such as SQLite® table C 308. Converting the raw data from various data sources to SQLite® tables makes the data in the SQLite® tables' agnostic of the underlying data source. To interpret the contents of the CSV file format, the retrieved global data mapping information is used. Global data mapping information includes identifiers, data types, and formulae's applied, etc. The global data mapping information is converted to a SQLite table such as SQLite table N 310. Table A to table N explained above are merely exemplary, depending on the metadata, data source, etc., various tables may be generated. All the SQLite tables generated in the mobile server 302 are compressed using one of the compression techniques such as Gzip. The compressed SQLite database 312 is sent to the mobile device as a compressed Gzip file, and stored in the mobile device. For example, 650 MB size file may be compressed to 50 MB size file using the Gzip compression technique.

FIG. 4A is exemplary table 400A illustrating workspace request and metadata, according to one embodiment. A request including document identifier, and open workspace is received from mobile server to BI platform. The BI platform responds with metadata associated with document, and consumption information that includes data source identifier. The table 400A shows row identifier '1', with request 'openPlusMetadata' 402, and response 'BLOB (size 1035438)' 404, where BLOB is binary large object. Response 'BLOB (size 1035438)' 404 includes workspace instance and metadata associated with the document. Row identifier '2' is shown with request 'consumption' 406, and response 'BLOB (size 6305)' 408. Response 'BLOB (size 6305)' 408 includes information of measures and dimensions associated with the document.

FIG. 4B is exemplary table 400B illustrating data stream including raw data associated with a document, according to one embodiment. For individual data source associated with the document a corresponding data stream table is generated. The data stream table contains raw data associated with the document in a comma separated value (CSV) format. The data stream table may be a relational database table such as SQLite® table. Depending on the number of data sources, the number of data stream tables may also vary. Data stream table 400B includes raw data in CSV format. For example, table 400B shows 'id_1' identifier, '2014-01-11 00:00:00.0' date and timestamp, 'Donald's market' name, 'US' country, 'Arizona' state, etc. Similarly entire raw data is stored in the data stream table in CSV format.

FIG. 4C is exemplary table 400C illustrating global data mapping associated with raw data, according to one embodiment. Global data mapping is used to interpret the contents of the data stream table in 400B that is in a CSV format. Global mapping information includes identifiers, data types, length, binding key, and formulae's applied, etc. The global mapping information is converted to an SQLite® table such as table 400C. Row 412 shows id as 'id_1', 'date' of data type date, and binding key '0'. Row 414 shows id as 'id_2', 'customer' of data type string, length '2', and binding key '1'. Similarly, other mapping information 416 is shown in the table 400C.

Figure 5:
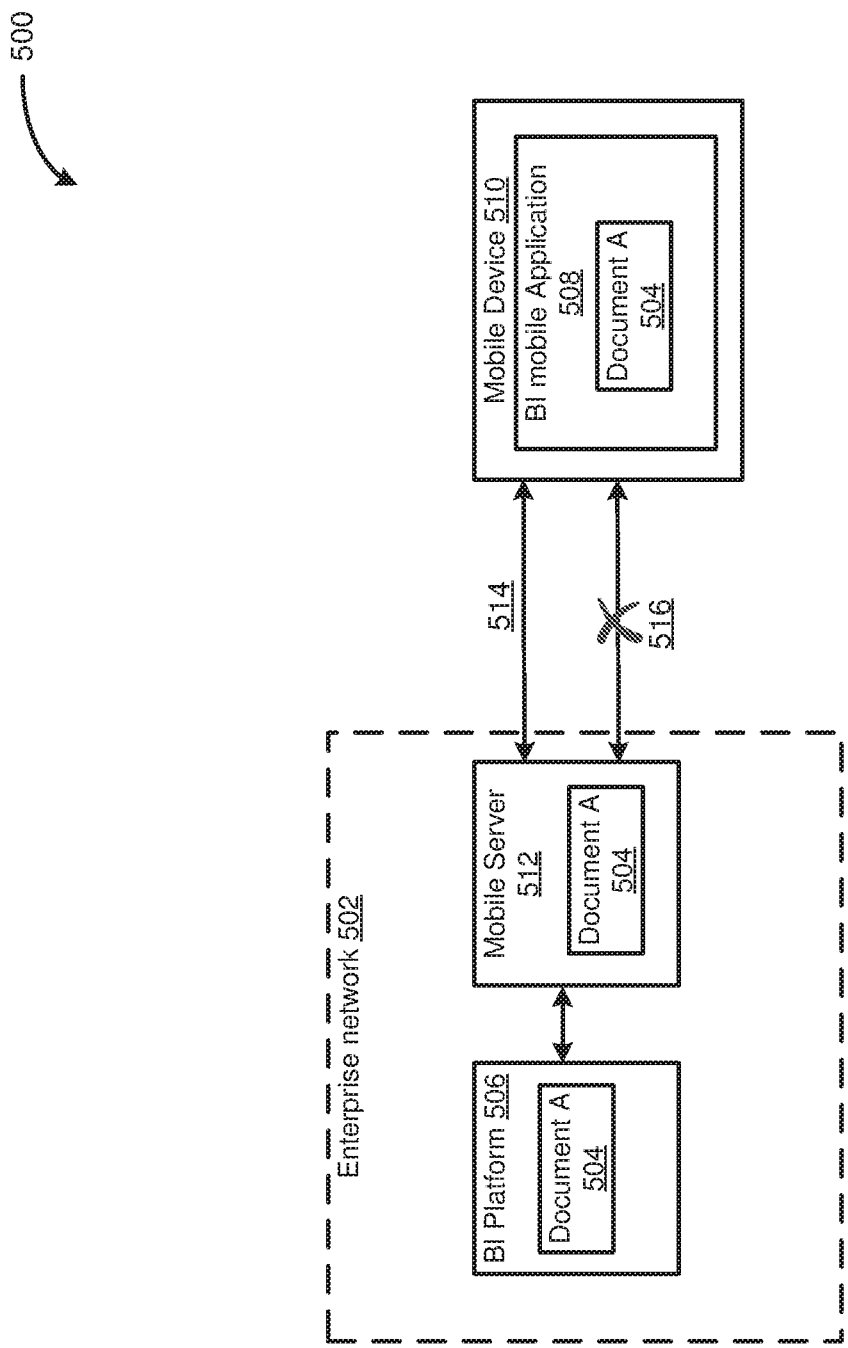
FIG. 5 is a block diagram illustrating document access when document is modified, according to one embodiment.

FIG. 5 is block diagram 500 illustrating document access when document is cached and modified, according to one embodiment. In enterprise network 502, document A 504 is downloaded from BI platform 506 to BI mobile application 508 executing in mobile device 510 via mobile server 512. The document A 504 is downloaded when mobile device 510 is connected 514 to the enterprise network 502. For example, document A 504 may be a large SQLite® database file close to gigabytes in size with 10000 rows of raw data. The large SQLite® database file with 10000 rows of raw data is received at the mobile server 512. The mobile server 512 may not be able to send the large SQLite® database file to the mobile device 510 at once, since it increases load on the mobile server 512. Also, when multiple such fetch requests are received from multiple mobile devices, the network latency increases, and the load on the mobile server 512 increases. To avoid such a network latency issue, few rows or protion of data from the large SQLite® database file are compressed at the mobile server 512, and sent to the mobile device 510, and this operation is performed in batches. The compressed data received in batches are appended at the mobile device 510. Therefore, a constant amount of memory is allocated for individual mobile devices in the mobile server 512 to respond to the requests from the individual mobile devices. Since the downloaded document A 504 is stored in the mobile device 510 as compressed SQLite® database file, even if the mobile device 510 is not connected 516 to the enterprise network, document A 504 can be accessed in the BI mobile application 508 in the mobile device 510.

Whenever the mobile device 510 is connected to the enterprise network 502, date and timestamp of the document A 504 in the mobile device 510 is compared with date and timestamp of the document A 504 in the enterprise network 502. If a new version of the document A 504 is available in the enterprise network 502, the new version of document A 504 is downloaded to the mobile device 510, whenever the mobile device 510 is connected to the enterprise network 502. This comparison may be performed automatically when the mobile device 510 is connected to the enterprise network 502, and a notification in the form of an alert may also be displayed in the mobile device 510. In one embodiment, when a request for document A 504 is received from the mobile device 510 at the BI platform 506, the BI platform 506 verifies the access level granted for the mobile device 510. During the first level of verification, if a user associated with the mobile device 510 has a view level permission, then document A 504 is available for view in the BI mobile application 508. During the second level of verification, if the user associated with the mobile device 510 has a data level permission, then data corresponding to the data level permission is available for access within the document A 504. The access level verification explained above is merely exemplary any type of access level such as role level may be used.

Frequently accessed documents are cached in a cache memory in the mobile server 512. For example, when document A 504 is accessed from the mobile device 510, the document is fetched from the BI platform 506 to the mobile server 512. When the document A 504 is compressed at the mobile server 512, the compressed filed is cached at the mobile server 512, and sent to the mobile device 510. When a subsequent request for accessing document A 502 is received from a new mobile device, the cached compressed file is retrieved from the mobile server 512 and sent to the new mobile device if the access level verification is successful. In case a new version of the document A 504 is fetched from the BI platform 506 to the mobile server 512, compressed new version of the document A 504 is cached in the cache memory of the mobile server 512.

Figure 6:
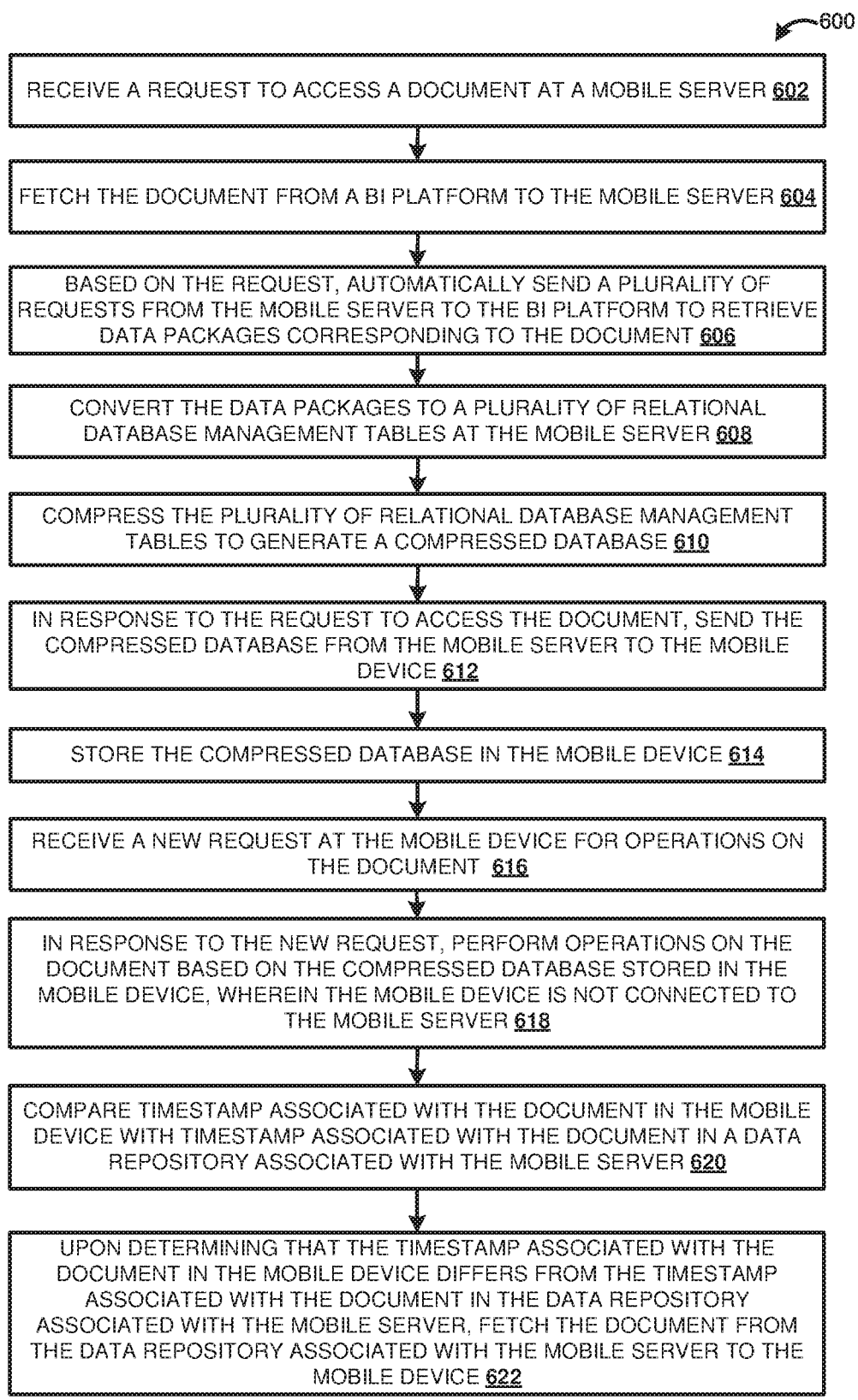
FIG. 6 is a flow chart, illustrating offline access of data in mobile devices, according to one embodiment.

FIG. 6 is flow chart 600, illustrating offline access of data in mobile devices, according to one embodiment. At 602, a request to access a document is received at a mobile server. At 604, the document is fetched from a BI platform to the mobile server. At 606, a plurality of requests is sent from the mobile server to the BI platform to retrieve data packages from the BI platform. At 608, the data packages are converted to a plurality of relational database management tables at the mobile server. At 610, the plurality of relational database management tables is compressed to generate a compressed database. At 612, the compressed database is sent to the mobile device. At 614, the compressed database is stored in the mobile device. At 616, a new request is received at the mobile device for operations on the document. At 618, in response to the new request, operations are performed on the document based on the compressed database stored in the mobile device, when the mobile device is not connected to the mobile server. At 620, a timestamp associated with the document in the mobile device is compared with timestamp associated with the document in a data repository associated with the mobile server. At 622, upon determining that the timestamp associated with the document in the mobile device differs from the timestamp associated with the document in the data repository associated with the mobile server, the document is fetched from the data repository associated with the mobile server to the mobile device.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
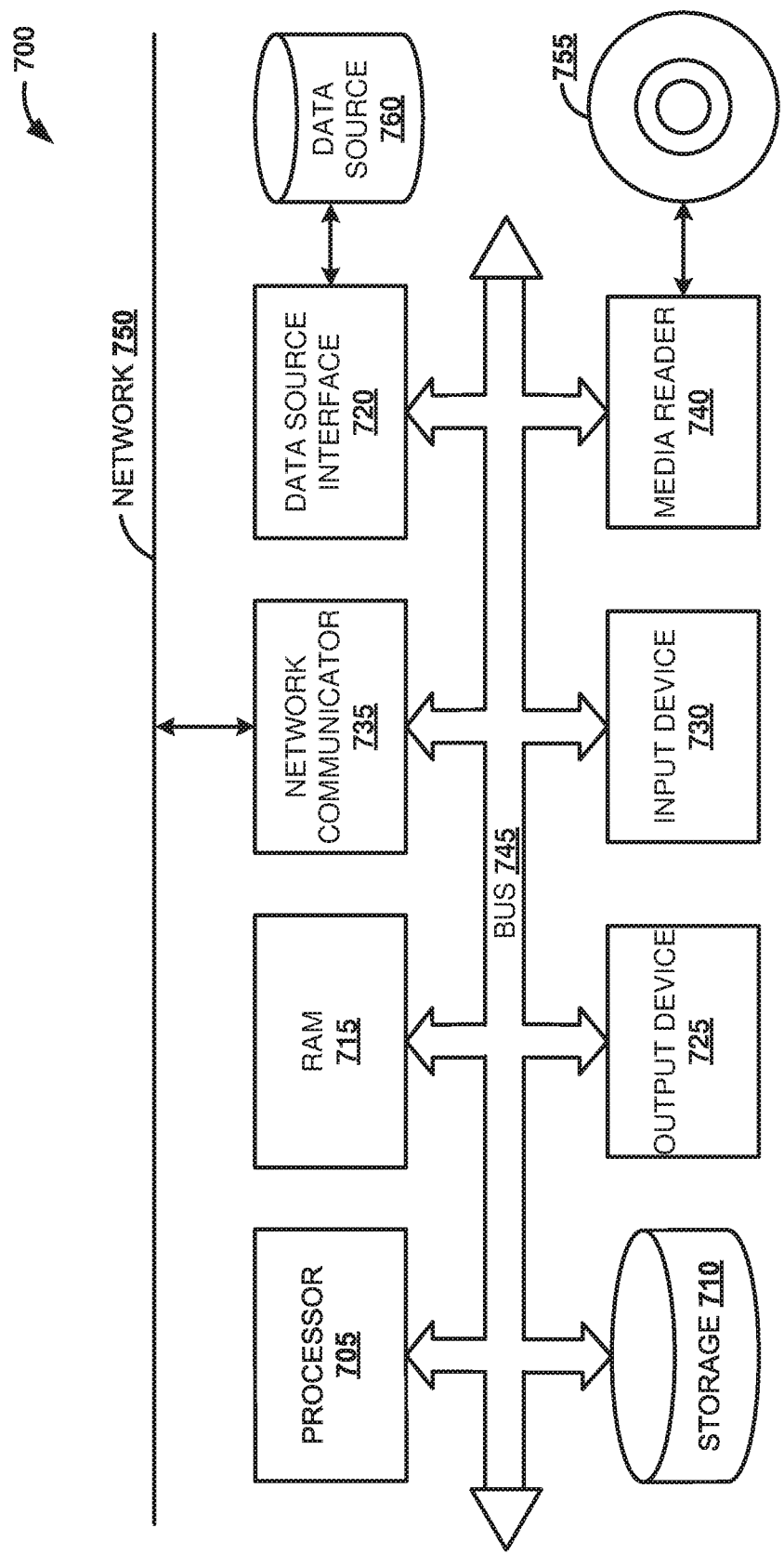
FIG. 7 is a block diagram illustrating an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receive, at a mobile server, a request to access a document;
   based on the request, automatically send, from the mobile server to a business intelligence (BI) platform, a plurality of requests to retrieve data packages corresponding to the document;
   based on responses from the BI platform, receive and load, at the mobile server, the data packages, wherein the data packages comprise a workspace instance comprising graphical representation charts included in the document, metadata for visualization of the graphical representation charts from the document, global data mapping information for interpreting content of the document, and a document object including raw data values associated with the document, wherein the raw data values from the document objects are interpreted based on the global data mapping information;
   convert the raw data values associated with the document into a first relational database management table, the global data mapping information into a second relational database management table, and the workspace instance with the metadata for visualization into a third relational database management table;
   compress, at the mobile server, the first relational database management table, the second relation database management table, and the third relational database management table corresponding to the document to generate one or more compressed databases to be sent in compressed form to a mobile device; and
   in response to the request to access the document, send, from the mobile server, the one or more compressed databases to a mobile device, wherein the mobile device is configured to store the one or more compressed databases, and wherein the mobile device is further configured to allow accessing the document from the one or more compressed databases stored in the mobile device without communicating with the mobile server.

2. The computer-readable medium of claim 1, further comprises instructions which when executed by the computer further cause the computer to:
receive a new request at the mobile device for operations on the document; and
in response to the new request, perform operations on the document based on the one or more compressed databases stored in the mobile device, wherein the mobile device is not connected to the mobile server.

3. The computer-readable medium of claim 1, further comprises instructions which when executed by the computer further cause the computer to:
compare a timestamp associated with the document in the mobile device with a timestamp associated with the document in a data repository associated with the mobile server; and
upon determining that the timestamp associated with the document in the mobile device differs from the timestamp associated with the document in the data repository associated with the mobile server, fetch the document from the data repository associated with the mobile server to store as a new version of the document at the mobile device.

4. The computer-readable medium of claim 1, further comprises instructions which when executed by the computer further cause the computer to:
store the document at a cache memory in the mobile server when the document is associated with multiple requests received from the mobile device.

5. The computer-readable medium of claim 1, further comprises instructions which when executed by the computer further cause the computer to:
retrieve the global data mapping information from the second relational database management table to interpret the content of the data packages, wherein the global data mapping information includes a mapping identifier, data type and length of data in the data packages.

6. The computer-readable medium of claim 1, further comprises instructions which when executed by the computer further cause the computer to:
compress data in the data packages in one or more batches at the mobile server to generate the one or more compressed databases; and
send the one or more compressed databases from the mobile server to the mobile device in batches.

7. A computer-implemented method for offline access of data in mobile devices, the method comprising:
receiving, at a mobile server, a request to access a document;
based on the request, automatically sending, from the mobile server to a business intelligence (BI) platform, a plurality of requests to retrieve data packages corresponding to the document;
based on responses from the BI platform, receiving and loading, at the mobile server, the data packages, wherein the data packages comprise a workspace instance comprising graphical representation charts included in the document, metadata for visualization of the graphical representation charts from the document, global data mapping information for interpreting content of the document, and a document object including raw data values associated with the document, wherein the raw data values from the document objects are interpreted based on the global data mapping information;
converting the raw data values associated with the document into a first relational database management table, the global data mapping information into a second relational database management table, and the workspace instance with the metadata for visualization into a third relational database management table;
compressing, at the mobile server, the first relational database management table, the second relation database management table, and the third relational database management table corresponding to the document to generate a one or more compressed databases to be sent in compressed form to a mobile device; and
in response to the request to access the document, sending, from the mobile server, the one or more compressed databases to a mobile device, wherein the mobile device is configured to store the one or more compressed databases, and wherein the mobile device is further configured to allow accessing the document from the one or more compressed databases stored in the mobile device without communicating with the mobile servers.

8. The method of claim 7, further comprising:
receiving a new request at the mobile device for operations on the document; and
in response to the new request, performing operations on the document based on the one or more compressed databases stored in the mobile device, wherein the mobile device is not connected to the mobile server.

9. The method of claim 7, further comprising:
comparing a timestamp associated with the document in the mobile device with a timestamp associated with the document in a data repository associated with the mobile server; and
upon determining that the timestamp associated with the document in the mobile device differs from the timestamp associated with the document in the data repository associated with the mobile server, fetch the document from the data repository associated with the mobile server to store as a new version of the document at the mobile device.

10. The method of claim 7, further comprising:
storing the document at a cache memory in the mobile server when the document is associated with multiple requests received from the mobile device.

11. The method of claim 7, further comprising:
retrieving the global data mapping information from the second relational database management table to interpret the content of the data packages, wherein the global data mapping information includes a mapping identifier, data type and length of data in the data packages.

12. The method of claim 7, further comprising:
compressing data in the data packages in one or more batches at the mobile server to generate the one or more compressed databases; and
sending the one or more compressed databases from the mobile server to the mobile device in batches.

13. A computer system for offline access of data in mobile devices, comprising:
a computer memory to store program code; and
at least one processor to execute the program code to:
receive, at a mobile server, a request to access a document;

based on the request, automatically send, from the mobile server to a business intelligence (BI) platform, a plurality of requests to retrieve data packages corresponding to the document;

based on responses from the BI platform, receive and load, at the mobile server, the data packages, wherein the data packages comprise a workspace instance comprising graphical representation charts included in the document, metadata for visualization of the graphical representation charts from the document, global data mapping information for interpreting content of the document, and a document object including raw data values associated with the document, wherein the raw data values from the document objects are interpreted based on the global data mapping information;

convert the raw data values associated with the document into a first relational database management table, the global data mapping information into a second relational database management table, and the workspace instance with the metadata for visualization into a third relational database management table;

compress, at the mobile server, the first relational database management table, the second relation database management table, and the third relational database management table corresponding to the document to generate one or more compressed databases to be sent in compressed form to a mobile device; and in response to the request to access the document, send, from the mobile server, the one or more compressed databases to a mobile device, wherein the mobile device is configured to store the one or more compressed databases, and wherein the mobile device is further configured to allow accessing the document from the one or more compressed databases stored in the mobile device without communicating with the mobile server.

14. The system of claim 13, wherein the at least one processor further executes the program code to:
receive a new request at the mobile device for operations on the document; and
in response to the new request, perform operations on the document based on the one or more compressed databases stored in the mobile device, wherein the mobile device is not connected to the mobile server.

15. The system of claim 13, wherein the at least one processor further executes the program code to:
compare a timestamp associated with the document in the mobile device with a timestamp associated with the document in a data repository associated with the mobile server; and
upon determining that the timestamp associated with the document in the mobile device differs from the timestamp associated with the document in the data repository associated with the mobile server, fetch the document from the data repository associated with the mobile server to store as a new version of the document at the mobile device.

16. The system of claim 13, wherein the at least one processor further executes the program code to:
retrieve the global data mapping information from the second relational database management table to interpret the content of the data packages, wherein the global data mapping information includes a mapping identifier, data type and length of data in the data packages.

17. The system of claim 13, wherein the at least one processor further executes the program code to:
compress data in the data packages in one or more batches at the mobile server to generate the one or more compressed databases; and
send the one or more compressed databases from the mobile server to the mobile device in batches.

* * * * *